Sept. 14, 1965        J. A. ZUPEZ ETAL        3,206,260
BEARING WEDGES

Filed June 19, 1961        3 Sheets-Sheet 1

INVENTORS.
JOHN A. ZUPEZ
ISAAC EUGENE COX
BY
Wallace Kinzer and Dorn
ATTORNEYS

Sept. 14, 1965  J. A. ZUPEZ ETAL  3,206,260
BEARING WEDGES

Filed June 19, 1961  3 Sheets-Sheet 2

INVENTORS.
JOHN A. ZUPEZ
ISAAC EUGENE COX
BY
*Wallace Kinzer and Dorn*
ATTORNEYS Sept. 14, 1965   J. A. ZUPEZ ETAL   3,206,260
BEARING WEDGES
Filed June 19, 1961   3 Sheets-Sheet 3
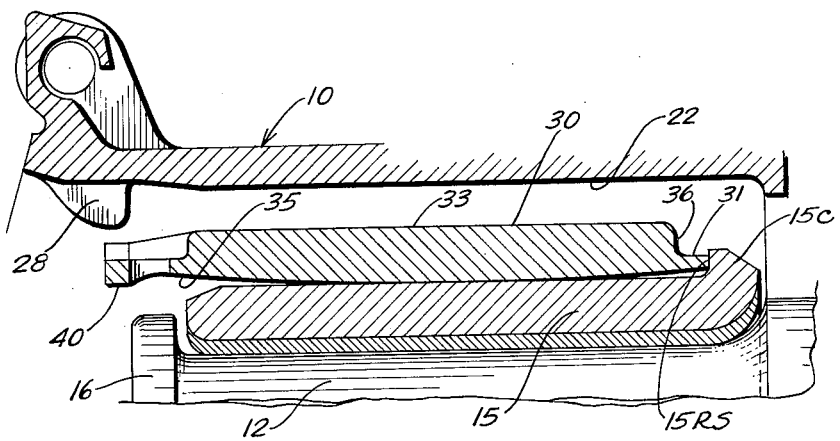
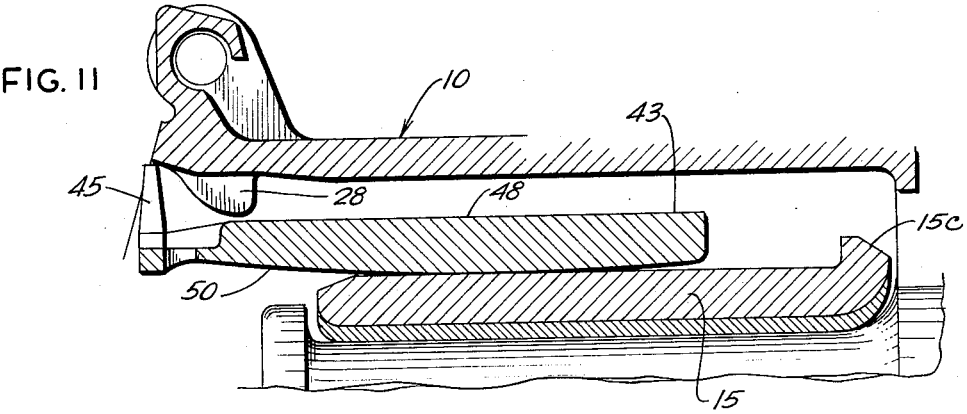
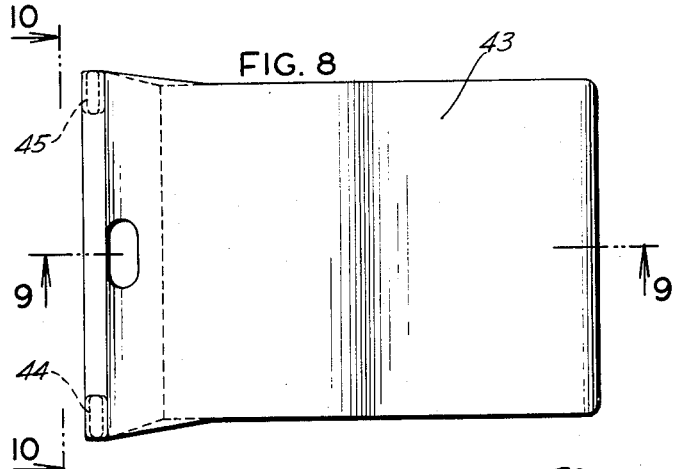
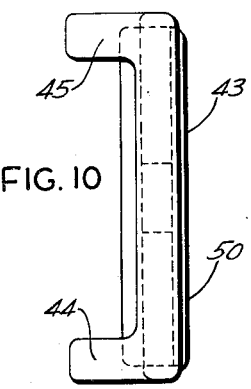
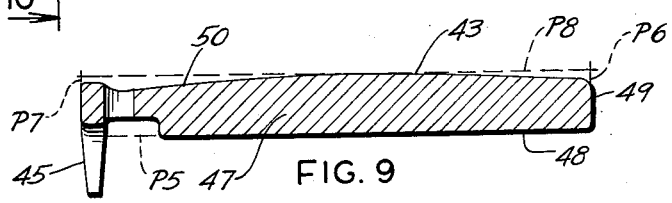
INVENTORS.
JOHN A. ZUPEZ
ISAAC EUGENE COX
BY
Wallace Kinzer and Dorn
ATTORNEYS

United States Patent Office 3,206,260
Patented Sept. 14, 1965

3,206,260
BEARING WEDGES
John A. Zupez, St. Louis, and Isaac Eugene Cox, Kirkwood, Mo., assignors to American Brake Shoe Company, New York, N.Y., a corporation of Delaware
Filed June 19, 1961, Ser. No. 118,091
2 Claims. (Cl. 308—40)

This invention relates to railroad equipment and in particular to the construction of a wedge that is to be installed in the journal box of a railroad car to be associated with what is known in the art as flat back journal bearing.

The standard flat back bearing for the journal portion of a railroad car axle is in the form of a segmental body having an inner arcuate bearing face conforming generally to the radius of the journal portion of the car axle that is disposed in the journal box. The opposed or back surface of the bearing is substantially flat and monoplanar with the exception of an upstanding collar at the end thereof that will be innermost in the journal box.

A flat back bearing of the kind herein involved has the essentially monoplanar back thereof spaced slightly from the inner surface of the top wall of the journal box, and a wedge is arranged in the resultant space, the wedge serving to maintain the bearing properly in position. The wedge that is used to hold a flat back bearing in place as above described includes a surface or side that is arcuate in a front to rear direction, that is, longitudinally or in the direction of the axis of the journal, and this arcuate surface of the wedge is the surface of the wedge that engages the inside face of the journal box top wall in a tangent relation. In contrast, the opposed side of the wedge is substantially flat and monoplanar so as to be complemental to and neatly engage the back of the flat back journal bearing associated therewith.

The cambered or arcuate back of the wedge is effective to produce self-alignment of the bearing as well as the wedge under various kinds of car movement, as for instance during movement of the side frame of the car truck relative to the general direction of car motion. Thus, the tangent relation between the journal box top wall and the arcuate back of the wedge enables the box in effect to rock slightly on the wedge. In this manner, the cambered top or arcuate back of the wedge, in conjunction with the flat opposed surface thereof, assures uniform distribution of loads over the entire surface of the back of the bearing in the event of relative motion of the side frame relative to the car axle, as for instance when the journal box rocks slightly.

The radius of curvature embodied in the arcuate surface of the conventional wedge to be used with a standard flat back bearing is relatively large and can vary from a fifty to a seventy-eight inch radius. It will be realized from this that there are circumstances where the radius side of the wedge to be used with a flat back railroad journal bearing may not be readily differentiated from the flat side on a mere visual inspection basis, and it can therefore happen that the wedge will be installed upsidedown in the journal box, particularly where illiterate and unskilled workers are involved. In such event, the improperly installed wedge, instead of distributing the load evenly on the back of the bearing, actually concentrates the load at a particular point on the bearing, and this can very likely result in a bearing failure or so-called hot box condition.

It will therefore be seen that it is extremely important to the proper operation of a flat back railroad journal bearing of the kind herein involved that the associated wedge be properly installed in the journal box right side up by the yard man, and the primary object of the present invention is to assure that the reverse or upside down condition will be readily recognized even by unskilled or illiterate workers responsible for railroad journal box wedge installations.

In connection with the foregoing, it will be recalled from the above description that the bearing at the one end thereof includes an upwardly projecting collar element. The wedge in turn is provided with a substantially flat rear surface which, when the wedge is fully and properly inserted in the journal box, will bear against the collar at the rear of the bearing. Additionally, the inside surface of the journal box top wall at the front thereof is provided with a downwardly projecting wedge lug element, and when the wedge is properly seated, with the rear surface thereof engaged with the collar at the rear of the bearing, the front of the wedge just clears the wedge lug on the journal box. Thus, the wedge in effect is seated between an upright element at the rear of the bearing and a depending element at the front of the journal box, and such arrangement serves as a lock to limit the extent of movement of the wedge parallel to the axis of the car journal.

When disposing the wedge as aforesaid, the journal box is raised or jacked up at a suitable repair area so that the inside surface of the top wall of the journal box is raised to be spaced well clear of the back of the journal bearing. Consequently, if either the bearing or the wedge needs to be replaced, either one can be extracted through the clearance space thus provided. It will therefore be seen that when the journal box is jacked, a wedge can be disposed in place, but it is a fact that the wedge usually associated with a flat back bearing, whether rightly positioned or positioned upside down in the journal box, can be inserted in the journal box with the ends thereof confined or locked between the collar or upright element on the bearing and the wedge lug or depending element on the journal box. The journal box can thereafter be lowered whether the wedge is properly or improperly installed. Therefore, the mere fact that the wedge has been installed and the journal box lowered back to what appears to be a normal running condition is no assurance that the wedge has been installed correctly. The object of the present invention is to obviate this ambiguity.

Under the present invention, and such constitutes a specific object hereof, the wedge is provided with a projection which, if the wedge is inserted upside down, will prevent the forwardmost end portion of the wedge from clearing the wedge lug on the journal box when the journal box is lowered after it is initially jacked incidental to enabling a wedge to be installed in the journal box. As a consequence of this aspect of the present invention, the journal box cannot be lowered without the wedge lug striking and hanging up on the forward end of the misfitted wedge, and even the most unskilled laborer or illiterate workman can recognize that a misfit is in fact involved and that something is wrong.

The projection on the wedge under one form of the present invention can be one that actually strikes the wedge lug on the journal box during attempted inverted installation, preventing full insertion of the wedge to the point where the rear face thereof is flush against the upstanding lug on the bearing. Consequently, the wedge does not clear the aforesaid lug and the journal box cannot be dropped all the way. The improper installation cannot fail to be observed. In another form of the invention, the projection which signals a wedge misfit in the event that the wedge is upside down can be a lip at the rear of the wedge, which lip leads the rear surface of the wedge that is intended to fit flush against the upstanding collar on the bearing. Consequently, this leading projection will strike the collar on the bearing. Again the front end of the wedge does not clear the wedge lug on the journal box, and the misfit manifests itself in an unmanageable condition of the journal box. If a wedge of the first form of the invention is installed correctly, then the projection at the front of the wedge will not strike the wedge lug of the journal box. If a wedge of the second form of the invention described is installed correctly, then the lip projection at the rear of the wedge will clear the bearing collar.

Other and further objects of the present invention will be apparent from the following description and claims and are illustrated in the accompanying drawings which, by way of illustration, show preferred embodiments of the present invention and the principles thereof and what is now considered to be the best mode contemplated for applying these principles. Other embodiments of the invention embodying the same or equivalent principles may be used and structural changes may be made as desired by those skilled in the art without departing from the present invention and the purview of the appended claims.

In the drawings:

FIG. 7 is a fragmentary sectional view of a journal box on an enlarged scale in comparison to FIG. 2 showing the improper installation therein of a wedge constructed in accordance with FIG. 3 or FIG. 5 hereof;

FIG. 8 is a top plan view of another form of wedge constructed in accordance with the present invention;

FIG. 9 is a sectional view taken on the line 9—9 of FIG. 8;

FIG. 10 is a front elevation taken on the line 10—10 of FIG. 8; and

FIG. 11 is a view similar to FIG. 7 but showing the improper installation of a wedge constructed in accordance with FIG. 8 hereof.

Figure 1:
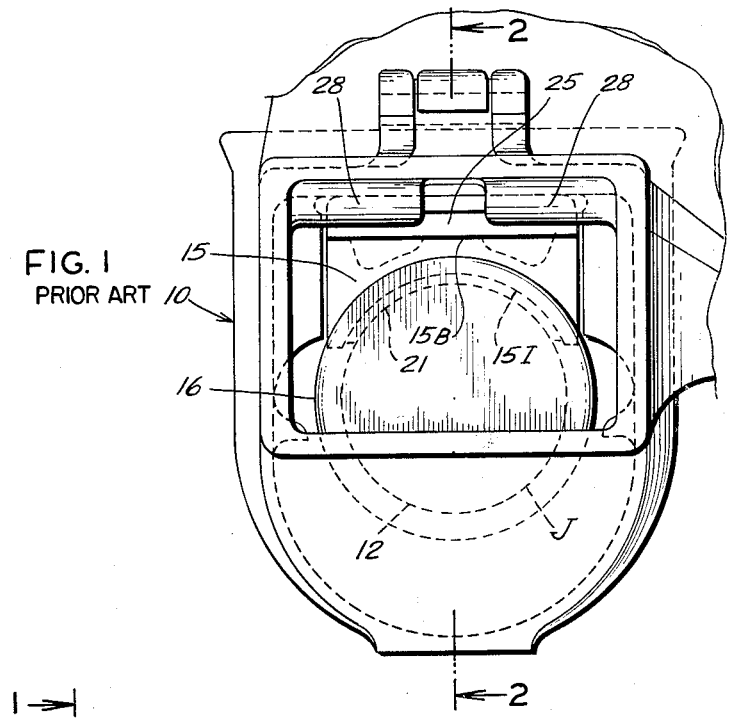
FIG. 1 is an end elevation of the journal box appearing in section in FIG. 2, and on the line 1—1 of FIG. 2.
Figure 2:
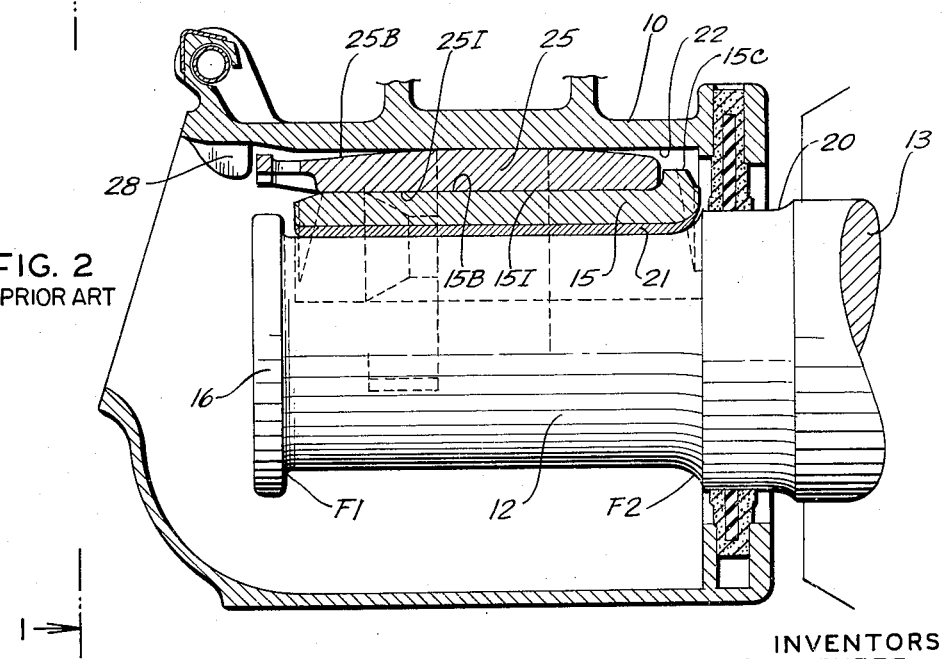
FIG. 2 is a sectional view of a railroad journal box taken on the line 2—2 of FIG. 1 and showing standard, conventional parts inclusive of a segment bearing and a wedge.

FIGS. 1 and 2 are views illustrating the arrangement of standard parts inside the journal box 10 of a railroad car, and wherein the journal portion 12 of the car axle 13 engages a sectional flat back bearing 15. The bearing 15 is of an axial length to fit between the fillet F1 at the inner face of the collar 16 of the journal and the fillet surface F2 inward of the dust guard seat 20 of the car axle. The bearing is slightly shorter than this dimension so as to allow lateral movement of the journal relative to the bearing, and the inner face 15I of the bearing is arcuate in transverse cross section (FIG. 1) so as to be substantially complemental to the radius of curvature of the journal. The inner face of the bearing is lined with a low friction alloy affording the lining 21 of the bearing on which the journal portion of the car axle will rotate when the car is in motion along the track. The ends of the lining 21 are rounded to be complemental to the fillet surfaces of the journal.

The back 15B of the bearing 15 is flat and is normally in a plane below the plane of the inside face 22 of the journal box top wall. A wedge 25 is interposed between the inside face of the journal box top wall and the flat back of the bearing. The wedge 25 illustrated in FIG. 1 is of known standard construction and is illustrated herein for a complete and comprehensive understanding of the present invention. The side 25I of the wedge 25 that is next to the bearing 15 is shaped complemental to the back of the bearing so as to neatly interfit therewith. The opposite or outer side 25B of the wedge is arcuate so as to have substantially tangential contact with the inside face of the journal box top wall. In this manner, the journal box has permissible rocking motion in a clockwise or counterclockwise direction relative to the wedge, bearing and journal assembly as viewed in FIG. 2. This relationship is an important one, permitting the car frame to rock relative to the car axle while assuring that forces will be evenly distributed along the length of the bearing.

The wedge 25 is retained against appreciable or objectionable longitudinal displacement as viewed in FIG. 1 by virtue of being located properly in place between an upright collar 15C, at the inner end of the bearing, and a depending wedge lug 28 fixed at the front upper edge of the journal box. This is the standard arrangement. However, it can be readily visualized from what is shown in FIG. 1 that a careless or unskilled workman might install the wedge 25 upside down in the journal box so that the arcuate side 25B thereof engages the flat back 15B of the bearing 15. As a result, the journal box 10 and the wedge would engage along flat surfaces. The journal box would not be encouraged to rock relative to the car axle should forces be created tending to cause this, and the arcuate side of the wedge being in engagement with the bearing would exert force on the bearing along a line rather than throughout the entire area of the bearing back. The present invention safeguards against this possibility as will now be described.

Two quite similar modifications of the present invention are illustrated in FIGS. 3 to 6 inclusive. The wedge 30, FIGS. 3 and 4, includes a projection 31 at the rear thereof as will be described in more particularity hereinbelow. The wedge 30 includes an elongated cast body 32 which has a substantially flat side 33 occupying a first plane indicated by the dotted line P1 in FIG. 4. This side of the wedge 30 is the one that is to engage the flat back of the bearing as 15 when the wedge is properly installed in a journal box.

The opposite side of the wedge 30, that is, the side opposite the planar surface 33, is defined by an arcuate surface 35 having a predetermined large radius of curvature, and this curved surface 35 is the surface on the wedge 30 which will normally engage the inside surface 22 of the top wall of the journal box when the wedge is properly installed.

Figure 4:
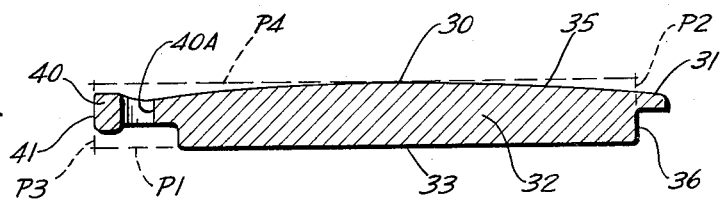
FIG. 4 is a sectional view taken on the line 4—4 of FIG. 3.

The rearwardmost surface of the wedge 30 is defined by a substantially planar surface 36, FIG. 4, which lies in a second plane P2 that is normal to the plane P1 of the flat side 33 of the wedge.

Figure 3:
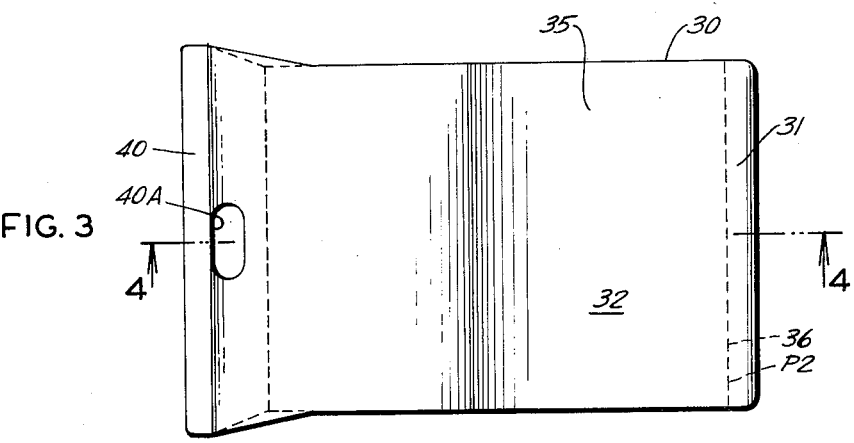
FIG. 3 is a top plan view of one form of wedge constructed under the present invention.

The front end of the wedge is defined by a lip or ledge 40, FIG. 3, which will be outermost of the journal box when the wedge is installed in the journal box as will be evident particularly in FIGS. 2 and 7, and this lip in accordance with standard practice is provided with an aperture 40A at the mid-section thereof to enable a standard tool to be used therewith as is well known in the art. The forwardmost end portion of the wedge is represented by a planar surface 41 which occupies the entire front of the lip 40, and this surface is disposed in a third plane P3 which extends at right angles to the planar surface 33. In other words, the planes P2 and P3 are parallel to one another.

It will be observed in FIG. 4 that the arcuate surface 35 at the back of the wedge is tangent to a plane P4, the plane P4 being parallel to the plane P1.

It will be observed from what is shown in FIG. 4 that the plane P1 representing the flat side 33, when projected, the planes P2 and P3 respectively of the rear and front surfaces of the wedge, when projected, and the plane P4, when projected, produce four right angle intersections to define a geometrical reference body which is of right trapezoidal section, or in other words, a rectangle when viewed in section in FIG. 4. It will further be observed that the projection 31 extends rearward at right angles to the planar surface 36 and projects beyond the aforesaid reference body which in its entirety is shown by intersecting lines in FIG. 4 identifying the planes P1, P2, P3 and P4.

Figure 5:
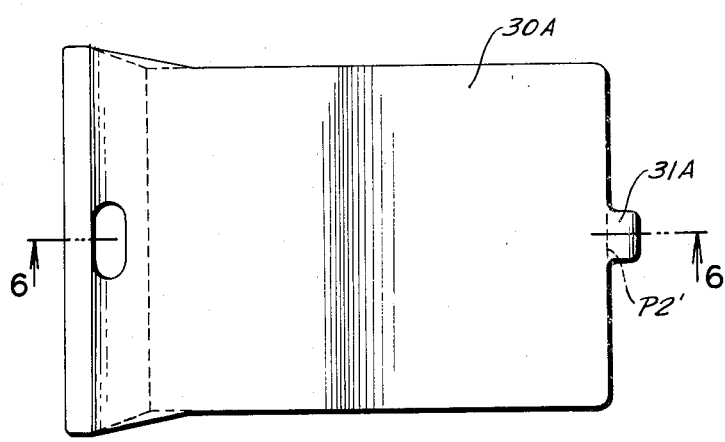
FIG. 5 is a top plan view of another form of wedge constructed under the present invention.
Figure 6:
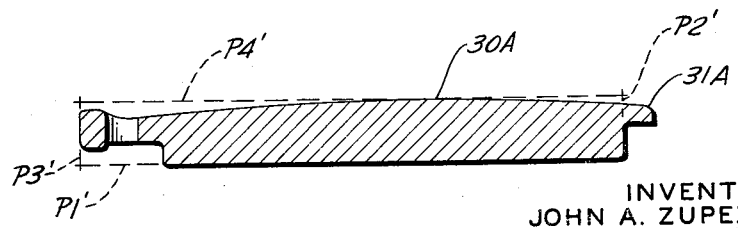
FIG. 6 is a sectional view taken on the line 6—6 of FIG. 5.

What has been set forth above by way of description of the wedge 30 also applies generally to the modified wedge 30A illustrated in FIGS. 5 and 6. In fact, the only difference is that the wedge 30 has a projection or rear lip 31 of reduced dimension which extends laterally the entire width of the wedge as shown particularly in FIG. 3, whereas the projection 31A of the wedge 30A is of narrow, reduced dimension, being centered on the longitudinal axis of the wedge 30A and symmetrically with respect thereto. Thus, the projection 31A extends for merely a portion of the lateral dimension at the rear of the wedge 30A. The relationships of planes described above in connection with the wedge 30 applies to the wedge 30A such that what has been described above in connection with the planes P1, P2, P3 and P4 is true of the planes P1′, P2′, P3′ and P4′, FIG. 6.

FIG. 7 illustrates the manner in which the projection 31 on the wedge 30 will prevent full insertion of the wedge 30 properly in the journal box if the wedge 30 is inadvertently oriented upside down. What is to be described in this regard is also true of the wedge 30A characterized by the projection 31A. Thus, if the wedge 30 should be inserted upside down the projection 31 at the leading end thereof moving in the direction of the rear of the bearing 15 will strike the collar element 15C at the rear of the bearing 15 in the journal box 10, thereby preventing the planar surface 36 at the rear of the wedge from complementally engaging the related surface 15RS at the forward side of the bearing collar 15C. Thus, as will be evident in FIG. 2, the standard or known wedge 25 at the rear surface thereof when properly installed will abut the bearing collar 15C, but under the present invention illustrated in FIGS. 3 and 5 hereof, the projection 31 or 31A, if the wedge is upside down, will prevent proper seating of the planar rear surface of the wedge defined as aforesaid, and consequently the forward lip 40 at the front of the wedge will not clear the wedge lug 28 at the front of the journal box sufficiently to enable the journal box to be lowered to a normal running condition, which can not be neglected or go unnoticed.

It will be recognized that under this form of our invention, the planes P2 and P3, FIGS. 4 and 6, are separated by a distance slightly less than the distance that separates the opposed or facing surfaces of the wedge lug 28 and the bearing collar 15C. Since the projection 31 or 31A extends a greater distance by virtue of lying outside the reference body P1–P2–P3–P4 or P1′–P2′–P3′–P4′, the front of the wedge will not be cleared by the wedge lug 28 when it is attempted to lower the journal box 10 on the inverted or improperly inserted wedge 30 or 30A. Being impossible to lower the journal box 10 to clear the inverted wedge 30 or 30A, this cannot help but be noticed by the workman.

Another form of the present invention is illustrated in FIGS. 8 to 10 as embodied in a wedge 43 of special shape. In this form of the invention, the wedge 43 is provided at the front with a projection 44 or 45 (or both) FIG. 9, which, if the wedge is installed upside down, will not clear the wedge lug 28 of the journal box to enable full insertion of the wedge to be accomplished.

Again, the wedge is cast to include an elongated body 47 having a flat or planar surface 48 at one side thereof lying in a first plane P5. The rear surface of the wedge 43 throughout is defined by a planar surface 49 that lies in a plane P6 that is normal to the first plane. The forwardmost end of the wedge 43 does not extend out of a third plane P7 which is disposed at right angles to the first plane P5. The wedge 43 includes an arcuate back 50 tangent to a plane P8 which, when projected, intersects the planes P6 and P7 at right angles, so it will be seen again that the reference body in this instance is a right trapezoid, and the projections 44 and 45 project beyond plane P5 and therefore beyond this reference body, being perpendicular to the plane P5.

In FIG. 11, there is illustrated the condition prevailing in the event the wedge 43 should be inserted into the journal box 10 in an inverted state. Under such circumstances, the projections 44 and 45 which extend outside the reference body P5–P6–P7–P8, FIG. 9, will strike the wedge lugs 28 of the journal box, rather than clearing the same. This occurs before full insertion of the wedge 43, and again circumstances surrounding the incorrect installation cannot help but be noticed by the workman.

It will be seen from the foregoing that we form a wedge to be associated with a flatback railroad journal bearing in such a manner that the journal box cannot be lowered to a normal running condition, a condition that cannot go unnoticed, if the wedge should be installed upside down.

Hence, while we have illustrated and described the preferred embodiments of our invention, it is to be understood that these are capable of variation and modification, and we therefore do not wish to be limited to the precise details set forth, but desire to avail ourselves of such changes and alterations as fall within the purview of the following claims.

We claim:

1. In a railroad journal box having a projection in the form of a wedge lug at the front thereof, a bearing engaging the journal of the railroad car, said bearing having a flat back in a predetermined plane and a projection in the form of an up-standing collar at the end thereof that is innermost of the box, said collar projection presenting a forward face, a wedge interposed between the bearing and the top wall of the box with said projection at the front of the box being disposed immediately adjacent the corresponding front end of the wedge and said projection on the bearing being disposed immediately adjacent the rear end of the wedge, said wedge having a first planar surface engageable complementally with the back of said bearing and a second planar surface engageable with the forward face of said collar projection, said wedge having an arcuate back in engagement with the inner face of the top wall of the journal box, and an extension at one of said ends of the wedge extending normal to one of said planar surfaces and which clears the one of said projections which is adjacent the end of the wedge having said extension only when the wedge is inserted in the journal box right-side-up.

2. An arrangement according to claim 1 wherein the extension on the wedge is intersected by the plane of the planar surface of the wedge with respect to which said extension is normally oriented.

References Cited by the Examiner

UNITED STATES PATENTS

| | | | |
|---|---|---|---|
| 1,127,963 | 2/15 | Christianson | 308—41 |
| 2,241,315 | 5/41 | Nelson | 308—38 |
| 2,277,812 | 3/42 | Barrows | 308—38 |
| 2,842,409 | 7/58 | Christensen | 308—38 |
| 2,992,865 | 7/61 | Klasing | 308—40 |
| 3,020,100 | 2/62 | Smith | 308—56 |

FOREIGN PATENTS 69,262   6/15   Switzerland.

ROBERT C. RIORDON, *Primary Examiner*.

FRANK SUSKO, R. A. DOUGLAS, *Examiners*.